(No Model.)
A. L. HOLMES.
BALL AND SOCKET JOINT FOR WATER AND GAS PIPES.
No. 346,478. Patented Aug. 3, 1886.
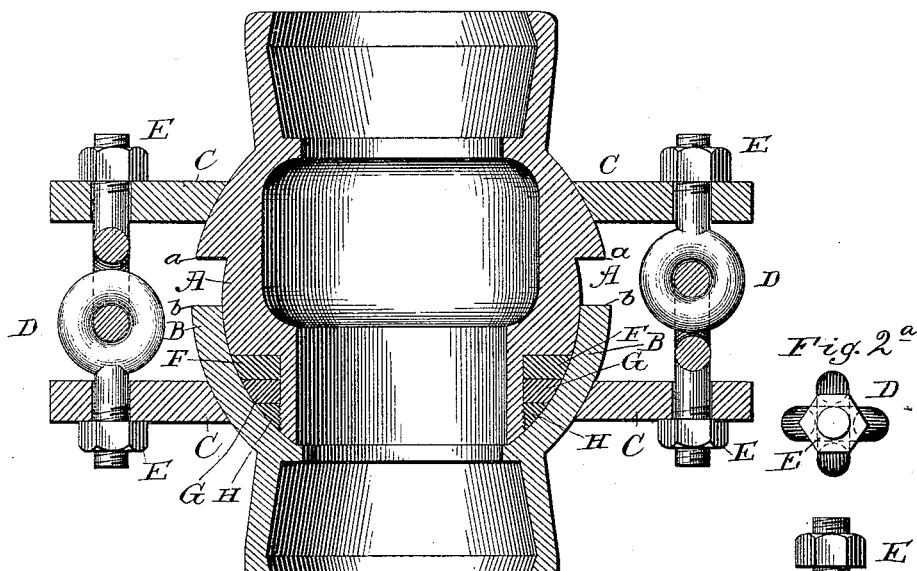
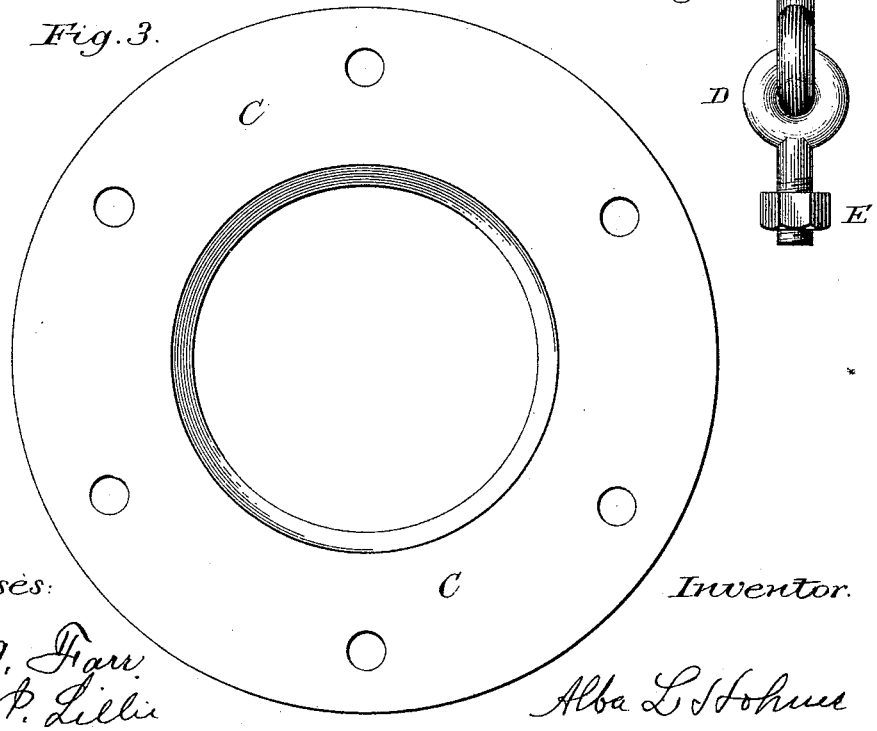
Witnesses:
Geo. A. Farr.
Walter P. Lillie
Inventor.
Alba L. Holmes

United States Patent Office.

ALBA L. HOLMES, OF GRAND HAVEN, MICHIGAN.

BALL-AND-SOCKET JOINT FOR WATER AND GAS PIPES.

SPECIFICATION forming part of Letters Patent No. 346,478, dated August 3, 1886.

Application filed April 16, 1886. Serial No. 199,130. (No model.)

*To all whom it may concern:*

Be it known that I, ALBA L. HOLMES, a citizen of the United States, residing at Grand Haven, county of Ottawa, and State of Michigan, have invented certain new and useful Improvements in Pipe Joints or Couplings, of which the following is a specification, reference being had to the accompanying drawings, forming part thereof.

The object of my invention is to provide a strong and convenient flexible pipe-coupling which will permit the sections of pipe which it joins to be moved relatively to each other without occasioning leakage in laying the pipes under water or elsewhere on uneven surfaces. I attain this object by means of the construction illustrated in the accompanying drawings, in which—

Figure 1 is a sectional view of my improved coupling. Figs. 2 and 2ª are detail views of the linked securing-bolts and their nuts, and Fig. 3 is a plan of one of the holding-plates.

The body of my coupling consists of two hollow sections or parts, A and B, the former having a ball-like or rounded termination fitting in the socketed part B. The ball-section A and socket-section B are held in contact by plates C fitting upon the adjoining portions of the said sections, said portions being of greater diameter than the outer ends thereof. The plates C are adjustably connected by linked or jointed bolts D, provided with nuts E.

Between the adjacent shoulders $a$ and $b$ of the ball-and-socket sections is a considerable space, as clearly shown in Fig. 1, which permits the said sections to move relative to each other as the pipes joined thereby are moved or deflected from a straight line in being laid, said shoulders, however, limiting such movement, so that the joint will not be rendered weak or unsafe by too great a displacement.

The contiguous faces of the ball-and-socket joint are ground or fitted to make a smooth and perfect fit, the joint being rendered absolutely tight by a packing consisting, in the present instance, of a gasket, F, of wood, a screw-threaded ring, H, of hard metal, as copper or brass, fitting a screw-threaded portion in the inner end of the ball-section A and an intermediate gasket or ring, G, of soft metal, as lead, the latter, before the parts are assembled, projecting slightly beyond the wood and hard metal, and thus forming a tight packing. The threaded ring H serves to hold the packing in place when the sections of the coupling are separated, and said ring may be screwed against the lead gasket G, to compress the latter and make it project more or less.

The jointed bolts D, connecting the plates or flanges C, permit the latter to move easily on the rounded surfaces, against which they impinge, such movement being sometimes necessary or desirable in adjusting the coupling to bring the parts to a proper bearing.

From the foregoing it will be apparent that sections of water or gas pipes arranged at a considerable angle to each other may be securely and tightly coupled together by my device, the coupling forming a flexible joint, permitting the pipe-sections to be moved relative to each other to form a bend in the pipe, when desired, without danger of occasioning leakage.

I do not wish to be understood as claiming, broadly, a ball-and-socket pipe-coupling, my invention consisting only in the constructions and combinations hereinafter indicated.

Having thus described my invention, I claim and desire to secure by Letters Patent—

1. In a pipe-coupling, the ball-and-socket sections A and B, having enlarged adjacent portions, one fitting within the other, and of greater diameter than the outer ends thereof, and the plates C, formed separate from the said sections, and having central openings fitting the outer surfaces of the enlarged portions of the coupling-sections, said plates having a space between them to admit of their proper adjustment, combined with bolts and nuts for securing the said plates and sections in place, substantially as set forth.

2. In a pipe-coupling, the combination, with the ball-and-socket sections A and B, having enlarged adjacent portions, one fitting within the other, of greater diameter than the outer ends thereof, and having also the shoulders $a$ and $b$, with a space between them, of the separated plates C, fitting the said enlarged portions of the said sections, and the interlinked jointed bolts and their nuts for holding said section and plates in place, substantially as set forth.

3. In a pipe-coupling, the combination, with the ball-and-socket sections, of a packing consisting of a wooden gasket, a hard-metal ring, and an intermediate ring or gasket of soft metal, substantially as set forth.

ALBA L. HOLMES.

Witnesses:
GEO. A. FARR,
W. I. LILLIE.